US012318048B2

(12) United States Patent
O'Brien et al.

(10) Patent No.: US 12,318,048 B2
(45) Date of Patent: Jun. 3, 2025

(54) SCRUBBING TOOL HAVING A MOVABLE TWO-SECTION HANDLE AND A DISSOLVABLE CLEANING HEAD

(71) Applicant: Scrub Daddy, Inc., Pennsauken, NJ (US)

(72) Inventors: John Edward Lee O'Brien, Pennsauken, NJ (US); Aaron C. Krause, Pennsauken, NJ (US); Aleksandrs Titovs, Pennsauken, NJ (US); Joe M. Vaccaro, Pennsauken, NJ (US)

(73) Assignee: SCRUB DADDY, INC., Pennsauken, NJ (US)

( * ) Notice: Subject to any disclaimer, the term of this patent is extended or adjusted under 35 U.S.C. 154(b) by 0 days.

(21) Appl. No.: 18/642,110

(22) Filed: Apr. 22, 2024

(65) Prior Publication Data

US 2024/0349958 A1 Oct. 24, 2024

Related U.S. Application Data

(63) Continuation of application No. 18/371,811, filed on Sep. 22, 2023, now Pat. No. 11,963,643, which is a (Continued)

(51) Int. Cl.
*A47L 25/00* (2006.01)
*A46B 9/00* (2006.01)
(Continued)

(52) U.S. Cl.
CPC .............. *A47K 17/00* (2013.01); *A46B 9/005* (2013.01); *A47L 25/00* (2013.01); *B08B 1/12* (2024.01); *B08B 3/08* (2013.01); *A46B 2200/304* (2013.01)

(58) Field of Classification Search
CPC ........... A47L 25/00; B08B 1/002; A46B 9/00; A47K 17/00
See application file for complete search history.

(56) References Cited

U.S. PATENT DOCUMENTS 2,271,861 A * 2/1942 Harris .................... A47K 11/10 15/210.1
2,610,347 A 9/1952 Kleiner
(Continued)

FOREIGN PATENT DOCUMENTS

CN 2131440 Y 5/1993
CN 1377241 A 10/2002
(Continued)

OTHER PUBLICATIONS

Extended European Search Report mailed Nov. 23, 2023 in corresponding European Patent Application 20855076.4.

*Primary Examiner* — Michael D Jennings
(74) *Attorney, Agent, or Firm* — Troutman Pepper Locke LLP

(57) ABSTRACT

A scrubbing tool for cleaning a surface that has a handle for holding by a user in a cleaning operation. The handle has a first connector. The scrubbing tool also has a cleaning head having a second connector configured to mate with the first connector in order to attach the cleaning head to the handle in an engaged position. The cleaning head is comprised entirely of a material configured to dissolve in water and has a cleaning agent.

20 Claims, 12 Drawing Sheets

Related U.S. Application Data continuation of application No. 16/997,848, filed on Aug. 19, 2020, now Pat. No. 11,779,171.

(60) Provisional application No. 62/888,680, filed on Aug. 19, 2019.

(51) Int. Cl.

| | |
|---|---|
| ***A47K 17/00*** | (2006.01) |
| ***B08B 1/12*** | (2024.01) |
| ***B08B 3/08*** | (2006.01) |

(56) References Cited

U.S. PATENT DOCUMENTS

| | | | | |
|---|---|---|---|---|
| 5,471,697 | A * | 12/1995 | Daconta | A47L 13/00 15/210.1 |
| 6,450,557 | B1 * | 9/2002 | Martinez | B25G 3/26 294/51 |
| 7,287,295 | B2 * | 10/2007 | Treacy | A47K 11/10 15/210.1 |
| 8,029,035 | B1 * | 10/2011 | Bottner | B25J 1/04 294/24 |
| 10,743,737 | B1 * | 8/2020 | Parrott | A47L 13/14 |
| 10,856,630 | B1 | 12/2020 | Hu | |
| 2004/0141794 | A1 * | 7/2004 | Slaboden | A47K 11/10 401/268 |
| 2004/0255418 | A1 * | 12/2004 | Minkler | A47K 11/10 15/210.1 |
| 2005/0005378 | A1 * | 1/2005 | Soller | A47K 11/10 15/210.1 |
| 2005/0055787 | A1 | 3/2005 | Blum et al. | |
| 2005/0066465 | A1 * | 3/2005 | Minkler | A47L 13/16 15/210.1 |
| 2005/0204499 | A1 | 9/2005 | Jackson | |
| 2006/0083578 | A1 | 4/2006 | D'Angelo | |
| 2006/0174914 | A1 | 8/2006 | Murphy | |
| 2008/0022472 | A1 | 1/2008 | Minkler et al. | |
| 2008/0104790 | A1 | 5/2008 | Tran | |
| 2009/0163126 | A1 * | 6/2009 | Hatch | A47K 11/10 451/461 |
| 2012/0011643 | A1 * | 1/2012 | Schultz | A47K 11/10 4/255.05 |
| 2012/0084933 | A1 | 4/2012 | Vetter et al. | |
| 2012/0246854 | A1 | 10/2012 | Uchiyama et al. | |
| 2015/0157178 | A1 | 6/2015 | Burns | |
| 2015/0374183 | A1 * | 12/2015 | Henry | A47K 11/10 15/160 |
| 2018/0132678 | A1 | 5/2018 | Farrow | |
| 2019/0021574 | A1 | 1/2019 | Krause et al. | |
| 2021/0169282 | A1 | 6/2021 | Tajong et al. | |
| 2023/0049070 | A1 | 2/2023 | Piorkowski et al. | |

FOREIGN PATENT DOCUMENTS

| | | | |
|---|---|---|---|
| CN | 1656974 | A | 8/2005 |
| CN | 101518427 | A | 9/2009 |
| CN | 107820408 | A | 3/2018 |
| EP | 2627232 | A1 | 4/2012 |
| KR | 1020150068850 | A | 6/2015 |
| WO | 01015587 | A1 | 3/2001 |
| WO | 01/43618 | A1 | 6/2001 |
| WO | 2004095998 | A1 | 11/2004 |

* cited by examiner

SCRUBBING TOOL HAVING A MOVABLE TWO-SECTION HANDLE AND A DISSOLVABLE CLEANING HEAD

CROSS-REFERENCE TO RELATED APPLICATIONS

This application is a continuation of U.S. patent application Ser. No. 18/371,811, filed on Sep. 22, 2023, now U.S. Pat. No. 11,963,643, issued on Apr. 23, 2024, which is a continuation of U.S. patent application Ser. No. 16/997,848, filed on Aug. 19, 2020, now U.S. Pat. No. 11,779,171, issued on Oct. 10, 2023, which claims the benefit of U.S. Provisional Patent Application Ser. No. 62/888,680, filed on Aug. 19, 2019, each of which is incorporated herein by reference in its entirety.

TECHNICAL FIELD

The present disclosure relates generally to products having dissolvable cleaning features, in particular, a scrubbing tool having a dissolvable and/or disintegrating cleaning head.

BACKGROUND

Cleaning supplies are often designed for specific applications for user convenience. Many cleaning supplies have a cleaning agent built-in to the end product so that the consumer can use the product out of the package. The cleaning agent may be part of a pre-wet packaging (e.g., cleaning wipes) or may be activated upon contact with water. An example of the latter category includes some toilet scrubbing products that include a cleaning agent built into a head of the product that activates when contacting water. These scrubbing tools are less than ideal, however, because the cleaning head needs to be disposed of after use, leading to challenges in waste and removal for used products.

The present disclosure is directed to embodiments of a cleaning product that overcomes these and other problems of the prior art.

SUMMARY

In at least some embodiments, a scrubbing tool for cleaning a surface is disclosed. The scrubbing tool includes a handle for holding by a user in a cleaning operation. The handle includes a first connector. The scrubbing tool also includes a cleaning head including a second connector configured to mate with the first connector in order to attach the cleaning head to the handle in an engaged position. The cleaning head is comprised entirely of a material configured to dissolve in water and has a cleaning agent.

In at least some embodiments, a scrubbing tool for cleaning a surface is disclosed. The scrubbing tool includes a handle comprising a first section and a second section, wherein the first section is relatively movable with respect to the second section. The scrubbing tool also includes a connection mechanism including a first connector connected to the handle and configured to engage a second connector on a cleaning head to attach a cleaning head to the handle. The scrubbing tool additionally includes a release mechanism configured to cause a cleaning head to be removed from the handle based on movement of the first section with respect to the second section. In at least some embodiments, a cleaning head configured to be attached to a handle is disclosed.

The cleaning head includes a back surface and a cleaning surface opposite the back surface. The cleaning surface includes a pattern of ridges and elevations. The cleaning head also includes a raised portion extending from the back surface and including a cavity for receiving a projecting portion on the handle. A depth of the cavity is greater than a height of the raised portion from the back surface. The cleaning head is comprised entirely of a material configured to dissolve or otherwise disintegrate in water and has a cleaning agent.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Figure 1A:
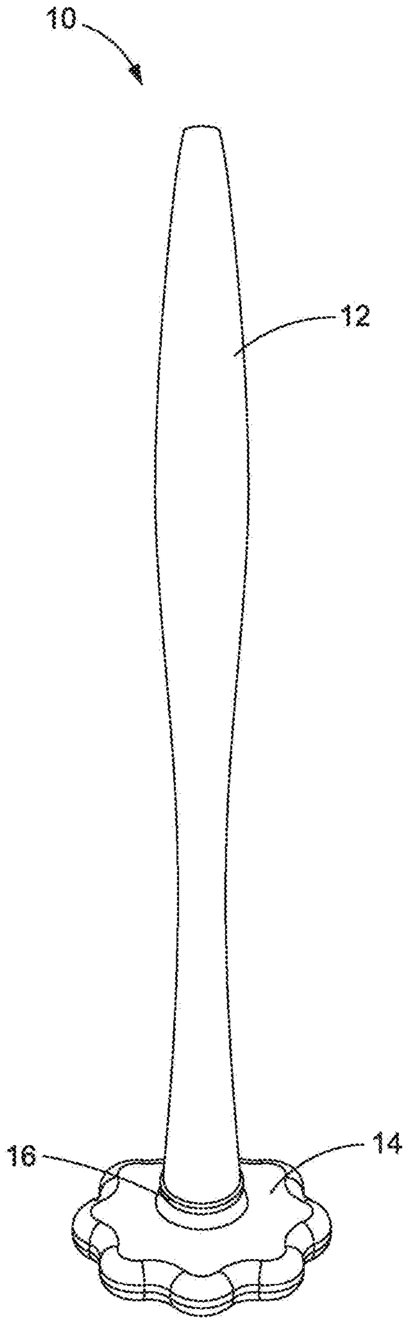
FIG. 1A is a front view of a scrubbing tool, according to a first embodiment.

The present disclosure describes a scrubbing tool having a handle with a connection mechanism for securely attaching to a dissolvable and/or disintegrating cleaning head. An example of a disclosed scrubbing tool is an implement which may be considered a toilet scrubber for cleaning the inside bowl portion of a toilet. However, it should be understood that the disclosed embodiments are not limited to toilet scrubbers. The disclosed embodiments include hand-held cleaning supplies in which a cleaning agent is in the form of a dissolvable and/or disintegrating component such as a dissolvable tablet, disintegrating cellulosic material, combination thereof, or other materials, that is securely connected to a handle for manipulation (i.e., scrubbing action) by a user.

Disclosed embodiments include a connection mechanism that ensures that the cleaning head is attachable to the handle, remains attached during use, allows for flexibility and maneuverability during use, and is easily removable when scrubbing is complete. The cleaning head is preferably formed to remain intact and gradually dissolve during use before completely dissolving over time when submerged in water. As such, in a toilet scrubbing application, the cleaning head can be used to scrub the bowl portion of the toilet before being released from the handle and dissolved in the water in the toilet before being flushed for removal. The handle is preferably reusable through attachment to another cleaning head for subsequent cleaning via the handle's connection mechanism.

As discussed the cleaning head is designed to completely break down in water such that it dissolves, dissociates, and/or disintegrates in water. It will be appreciated that there is a balance between product breakdown and time for that to occur. Importantly, although the cleaning head could be disposed in a trash receptacle, that is not the intent here. The intent is to have a cleaning head that relatively quickly releases cleaning product to effect cleaning, maintaining structural integrity during cleaning to facilitate scrubbing, and finally being completely dissolvable, dissociative, and/or disintegrable upon prolonged contact with water, either in the object to be cleaned (e.g. a toilet) or in the waste stream (e.g. in the pipes after flushing). The cleaning head includes one or more of a cleaning agent, a dissolvable/disintegrable scrubbing element, binder, filler, colorant, fragrance, preservative or other dissolvable, dissociative, or disintegrable material.

The cleaning agent may, for example, include one or more of a surfactant, a soap, a detergent, a bactericidal agent, a bleaching agent, a chelant, a salt, a coloring agent, fragrances and preservatives.

The scrubbing element may be any suitable material provided it is dissolvable, dissociative, and/or disintegrable in water. For example, and not by way of limitation, the scrubbing agent can include cellulosic material (e.g. paper), solid cleaning agents (e.g. powder, granules, pellets, etc.) or combinations thereof. Through choice of material, the rate of dissolution, disassociation, and/or disintegration can be controlled to balance the time needed to clean and the time needed to reach a flushable or other desirable stated, and to allow complete dissolution, disassociation, and/or disintegration.

Some embodiments may further include effervescent agents such as citric acid. Again though choice of materials the amount and timing of the effervescence may be controlled.

The cleaning head may be made of various layers, where each layer may have it's own profile. For example, an outermost layer can be a quickly releasing cleaning agent to provide cleaning agent to the area to be cleaned. This may also include sudsing agents. The next layer, for example could be a more strongly held together layer combining an abrasive and cellulosic material that allows for some scrubbing. Once scrubbing is complete, and this layer dissolved, disassociated, or disintegrated or otherwise worn down, it could expose an effervescent layer. In one embodiment, the toilet could be flushed removing any remaining cleaning agent, abrasive material, leaving the effervescent layer, still attached to the cleaning wand. The remaining layer could then be detached from the wand and left in the bowl to effervesce, releasing, for example, a pleasant colorant and/or fragrance.

Those of skill in the art will recognize, after having read this disclosure, many options are available for making such cleaning heads. With the guidance provided herein, choosing the right cleaning agents and accompanying components depends on the use and desired effects.

Figure 1B:
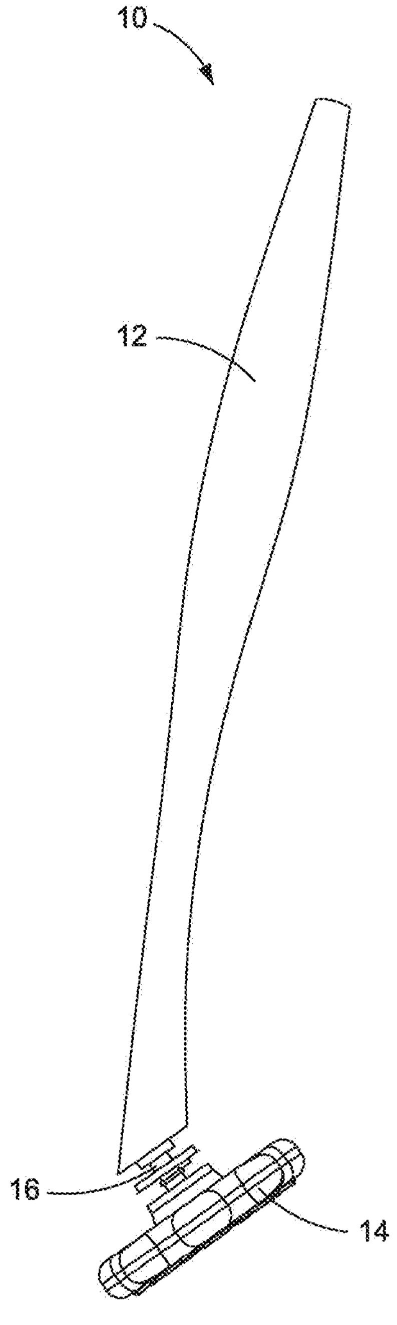
FIG. 1B is a side view of the scrubbing tool of FIG. 1A.

FIGS. 1A and 1B are front and side views, respectively, of an exemplary scrubbing tool 10 consistent with disclosed embodiments. The scrubbing tool 10 may include a handle 12, a cleaning head 14, and a connection mechanism 16. The handle 12 is elongated and configured to be held by a user. The cleaning head 14 is attached to the handle 12 by the connection mechanism 16.

Figure 2:
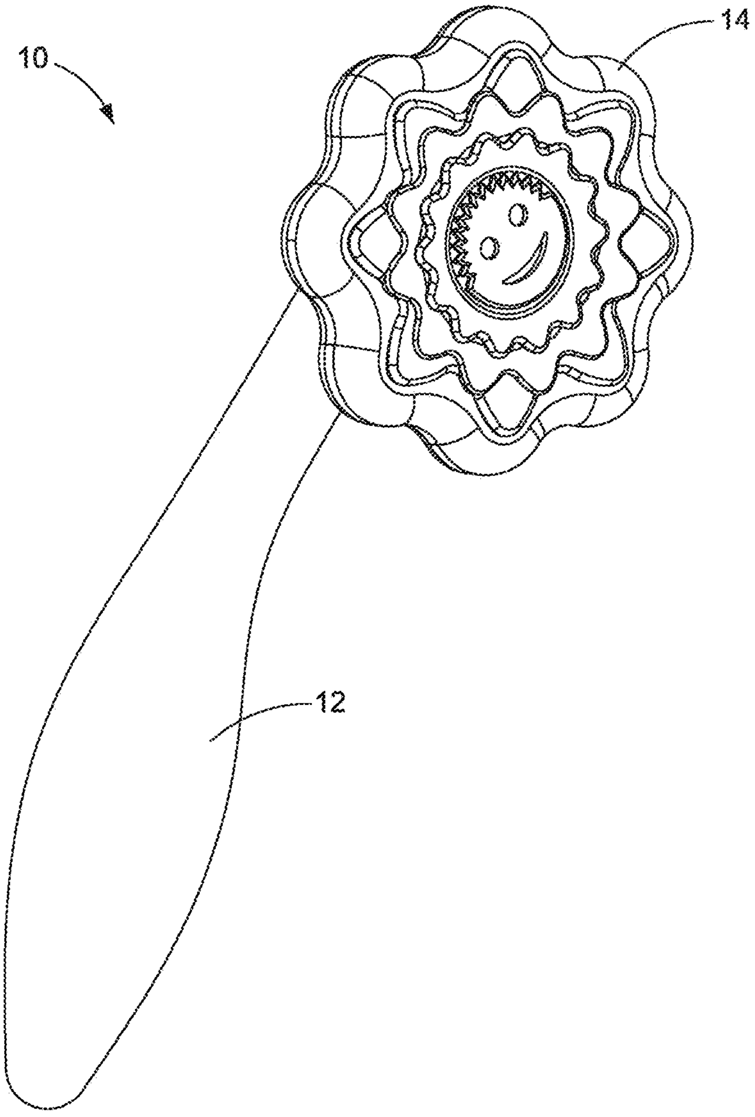
FIG. 2 is a bottom view of the scrubbing tool of FIG. 1A.

FIG. 2 is a bottom view of the scrubbing tool 10 further showing the cleaning head 14. The cleaning head 14 is preferably a completely dissolvable tablet including a cleaning agent. In some embodiments, the cleaning head 14 is configured with a combination of cleaning agents and fragrances. The cleaning head 14 may dissolve or disassociate gradually over time. For instance, the tablet may comprise materials that dissolve effervescently while simultaneously cleaning and giving off fragrance. Various embodiments could be made to completely dissolve at any time interval, such as 5 to 10 minutes for normal household use. In at least some embodiments, the materials that make up the cleaning head 14 are safe for flushing when appropriately sized due to dissolution of the tablet. In some embodiments, the cleaning head 14 is designed to be used as an in-tank toilet cleaning tablet after being used on the scrubbing tool 10. In these embodiments, after the scrubbing tool 10 is used to clean the bowl of the toilet, the user releases the cleaning head 14 into the tank of the toilet. The cleaning head 14 would then dissolve over time and release cleaning solution into the tank water. As the cleaning solution circulates around the bowl with each flush, the solution acts to further clean the bowl.

Figure 3A:
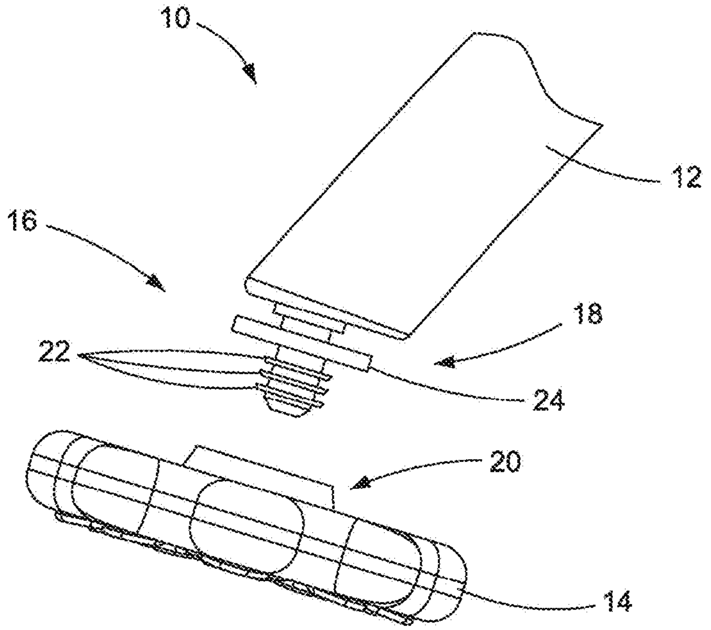
FIG. 3A is a close-up of a connection mechanism of the scrubbing tool of FIG. 1A in a disengaged position.

FIG. 3A is a close-up view of a first exemplary embodiment of the connection mechanism 16. The connection mechanism 16 may include a first connector 18 and a second connector 20. In at least some embodiments, the first connector 18 may be a male connector and the second connector 20 maybe a female connector for receiving the male connector. In the depicted embodiment, the first connector 18 extends from a bottom portion of the handle 12. The second connector 20 may be configured to mate with the first connector 18 to attach the handle 12 to the cleaning head 14. The second connector 20 may be an aperture or receptacle formed in a top portion of the cleaning head 14.

In an exemplary embodiment, the first connector 18 includes a projection portion that is configured to be press fit into the second connector 20 of the cleaning head 14. The first connector 18 may be a flexible, polymer component with one or more flexible rings 22 formed around a perimeter thereof. The flexible rings 22 may act as sealing gaskets to ensure a water-tight fit between the connectors 18, 20. For instance, the flexible rings 22 may be sized with a diameter at least the same or slightly larger than a diameter of the opening into the second connector 20. This sealing engagement helps to maintain the connection between the handle 12 and the cleaning head 14 by inhibiting water from entering the connection area and dissolving the cleaning head 14 near the second connector 20 (e.g., enlarging the diameter of the opening into the second connector 20). The first connector 18 may include a flange 24 sized larger than the opening of the second connector 20 to further seal the attachment by closing off the second connector 20 at the top while the projecting portion and flexible rings 22 are inside of the second connector 20.

Figure 3B:
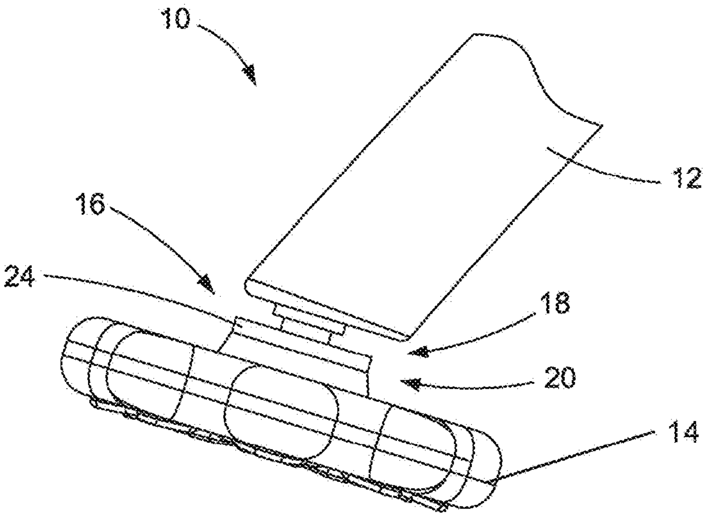
FIG. 3B is a close-up of the connection mechanism of FIG. 3A in an engaged position.

FIG. 3B is a close-up view of the connection mechanism 16 in an engaged position. In the engaged position, the flange 24 is flush with a top surface of the cleaning head 14. For example, the flange 24 may be in surface contact with a portion of the cleaning head 14 that surrounds the opening into the second connector 20 while a projection portion of the first connector 18 is within the second connector 20. The connection mechanism 16, in an exemplary embodiment, is configured to allow the cleaning head 14 to pivot and flex with respect to the handle 12 to enhance a cleaning action and allow the cleaning head 14 to follow a contour of a surface being cleaned. For example, the connection mechanism 16 may include a ball joint or rotatable axle joint within the handle 12.

Figure 4A:
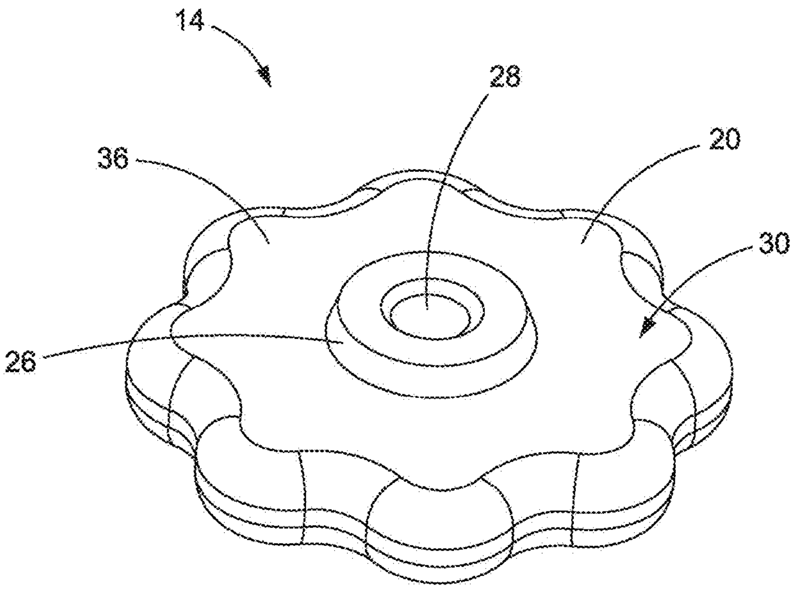
FIG. 4A is a top perspective view of a cleaning head that may be used in conjunction with the scrubbing tool of FIG. 1A.
Figure 4B:
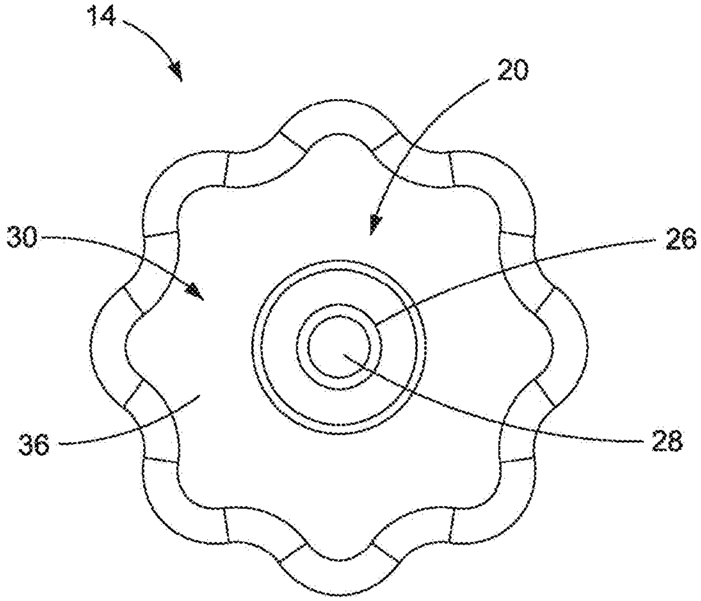
FIG. 4B is a top view of the cleaning head of FIG. 4A.
Figure 4C:
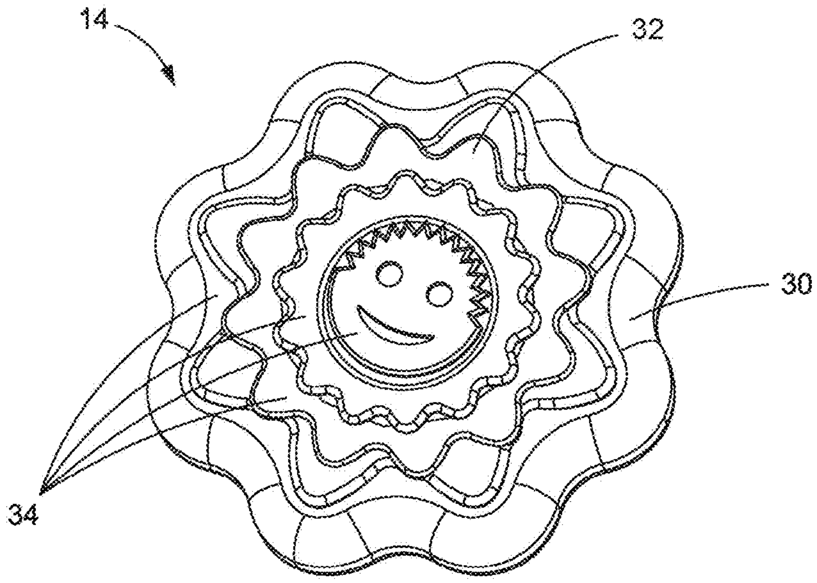
FIG. 4C is a bottom perspective view of the cleaning head of FIG. 4A.
Figure 4D:
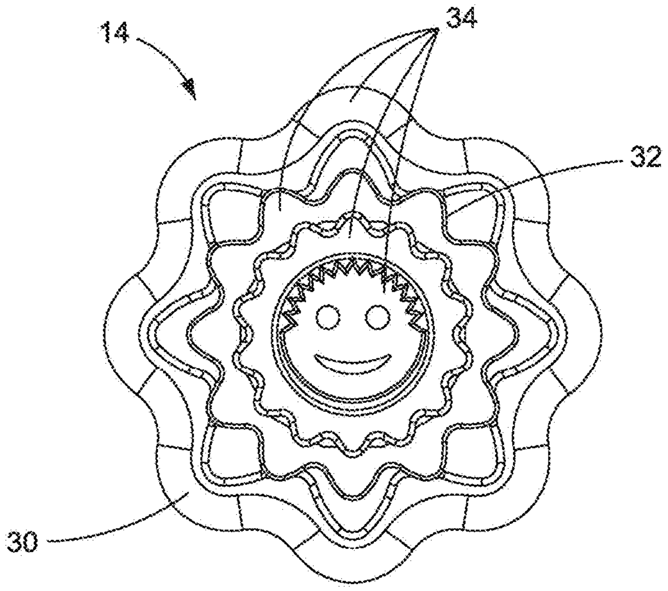
FIG. 4D is a bottom view of the cleaning head of FIG. 4A.
Figure 4E:
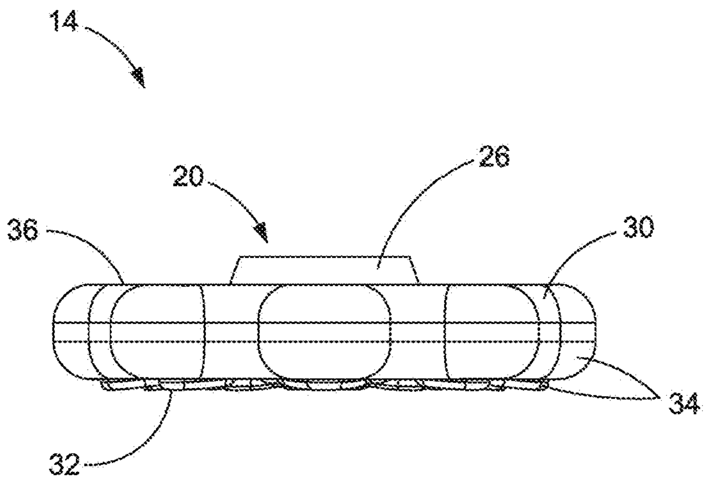
FIG. 4E is a side view of the cleaning head of FIG. 4A.
Figure 4F:
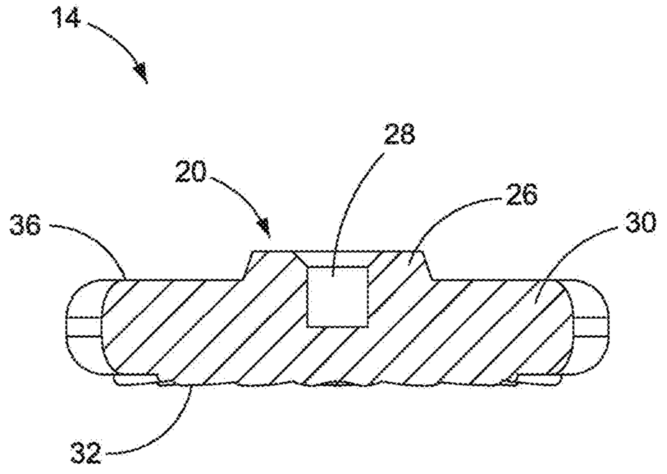
FIG. 4F is a cross-sectional view of the cleaning head of FIG. 4A.

FIGS. 4A-4F depict various views of the cleaning head 14, according to an exemplary embodiment. FIGS. 4A and 4B are views of a top portion of the cleaning head 14. FIGS. 4C and 4D are views of a bottom portion of the cleaning head 14. FIG. 4E is a side view of the cleaning head 14. FIG. 4F is a cross-sectional view of the cleaning head 14.

As shown in FIGS. 4A, 4B, 4E, and 4F, the top portion of the cleaning head 14 includes the second connector 20. In an exemplary embodiment, the second connector 20 includes raised portion 26 having a cavity 28 (see FIG. 4F). The raised portion 26 creates a space between a main body 30 of the cleaning head 14 and the handle 12 (not shown in FIGS. 4A-4F) when the cleaning head 14 is in the engaged position, thereby providing room for the cleaning head 14 to pivot and flex during use. The raised portion 26, in an exemplary embodiment, is centered with respect to the main body 30 of the cleaning head 14. In some embodiments, the cavity 28 (see, e.g., FIG. 4A) is centered with respect to the raised portion 26.

As shown in FIGS. 4C and 4D, the bottom portion of the cleaning head 14 includes a cleaning surface 32 for being the primary or initial surface for cleaning during use. The cleaning surface 32 may include a pattern of ridges and elevations throughout to create various edges that enhance cleaning and increase the surface area of the cleaning surface 32 to promote dissolving of the cleaning surface 32 gradually during use. The cleaning surface 32 shown in FIGS. 4C and 4D is exemplary and the disclosed embodiments are not limited thereto. In other words, other shapes and patterns of ridges and elevations may be used in alternative embodiments.

In an exemplary embodiment, the main body 30 includes a plurality of levels 34 that create a variety of thicknesses of the cleaning head 14 from a flat back surface 36 (not considering the raised portion 26) to the cleaning surface 32. For instance, the main body 30 may include a plurality of levels 34 that decrease in thickness outward from a center of the main body 30. In this way, the cleaning head 14 may provide a tapered cleaning surface 32 even as the cleaning head 14 dissolves during use, allowing for targeted cleaning of certain spots on a surface to be cleaned and further enabling the cleaning surface 32 to follow a contour of the surface to be cleaned, such as the inside of a toilet. In some embodiments, the levels 34 have shapes that generally match a perimeter of the main body 30 of the cleaning head 14.

As shown in FIG. 4E, the raised portion 26 may be tapered such that a diameter of the raised portion is larger closer to the main body 30. This tapering may further urge water away from the cavity 28 and contribute to the strong connection between the handle 12 and the cleaning head 14. Moreover, the cavity 28, as shown in FIG. 4F may include a depth that is greater than a height of the raised portion 26. In other words, the cavity 28 may extend past the flat back surface 36 and into the main body 30. This configuration also contributes to the strong connection between the handle 12 and the cleaning head 14 by providing a greater depth for the first connector 18 with the flexible rings 22 to engage in the second connector 20.

Figure 5A:
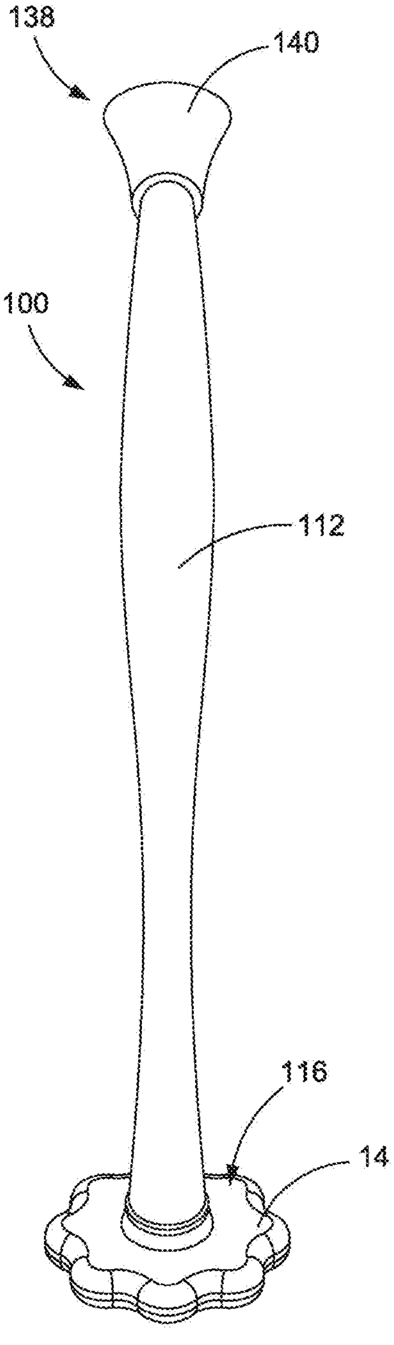
FIG. 5A is a front view of a scrubbing tool, according to a second embodiment.
Figure 5B:
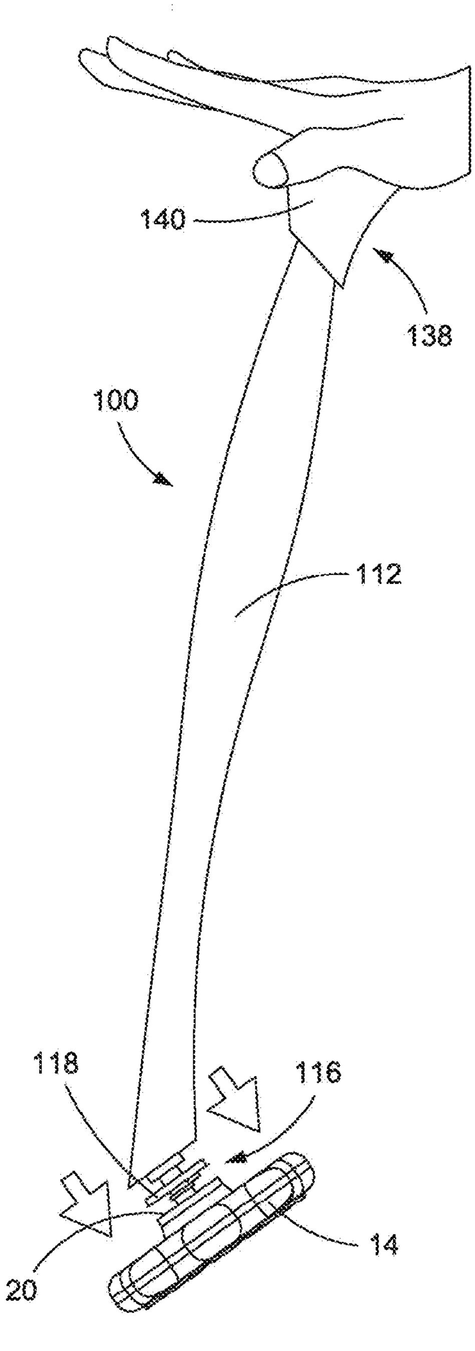
FIG. 5B is a side view of the scrubbing tool of FIG. 5A, further illustrating a release mechanism for disconnecting a cleaning head from a handle.

FIGS. 5A and 5B depict another embodiment of a scrubbing tool 100. The scrubbing tool 100 includes a handle 112 and is configured to operate in conjunction with the cleaning head 14 described herein with respect to the handle 112. The scrubbing tool 100 includes a connection mechanism 116 including a first connector 118 configured to mate with the second connector 20 of the cleaning head 14. The first connector 118 (see FIG. 5B) may be the same as or similar to the first connector 18 described above (see, e.g., FIG. 3A). The connection mechanism 116 may further comprise a release mechanism 138 configured to cause the cleaning head 14 to be removed from the handle 112. For instance, the release mechanism 138 may include a release knob 140 configured to move the first connector 118 with respect to the cleaning head 14 such that the first connector 118 exits the second connector 20 and the cleaning head 14 drops off of the handle 112. Various configurations may be used to configure the release mechanism 138 to cause the handle 112 to disengage the cleaning head 14. For example, the release knob 140 shown in FIGS. 5A-5B may be pressed (or pulled in other embodiments) to retract the first connector 118 away from the cleaning head 14, causing a bottom of the handle 112 to contact the cleaning head 14 and force the cleaning head 14 out of engagement with the first connector 118. For instance, a lever, axle, or bar may run through a cavity in the handle from the release knob 140 to the first connector 118 to enable the relative movement. Further, it should be understood that the release knob 140 is exemplary and that other manual control elements may be used, such as buttons, levers, switches, pull tabs, etc.

The release mechanism 138 provides an efficient and easy-to-use functionality to the scrubbing tool 100 in that the cleaning head 14 may be securely connected to the handle 112 for use and then released after use without the user being required to touch the cleaning head 14. Moreover, because the entire cleaning head 14 is dissolvable in water, the user can simply activate the release mechanism 138 to remove the cleaning head 14 while it remains in the toilet after scrubbing the inside surfaces of the toilet.

Figure 6A:
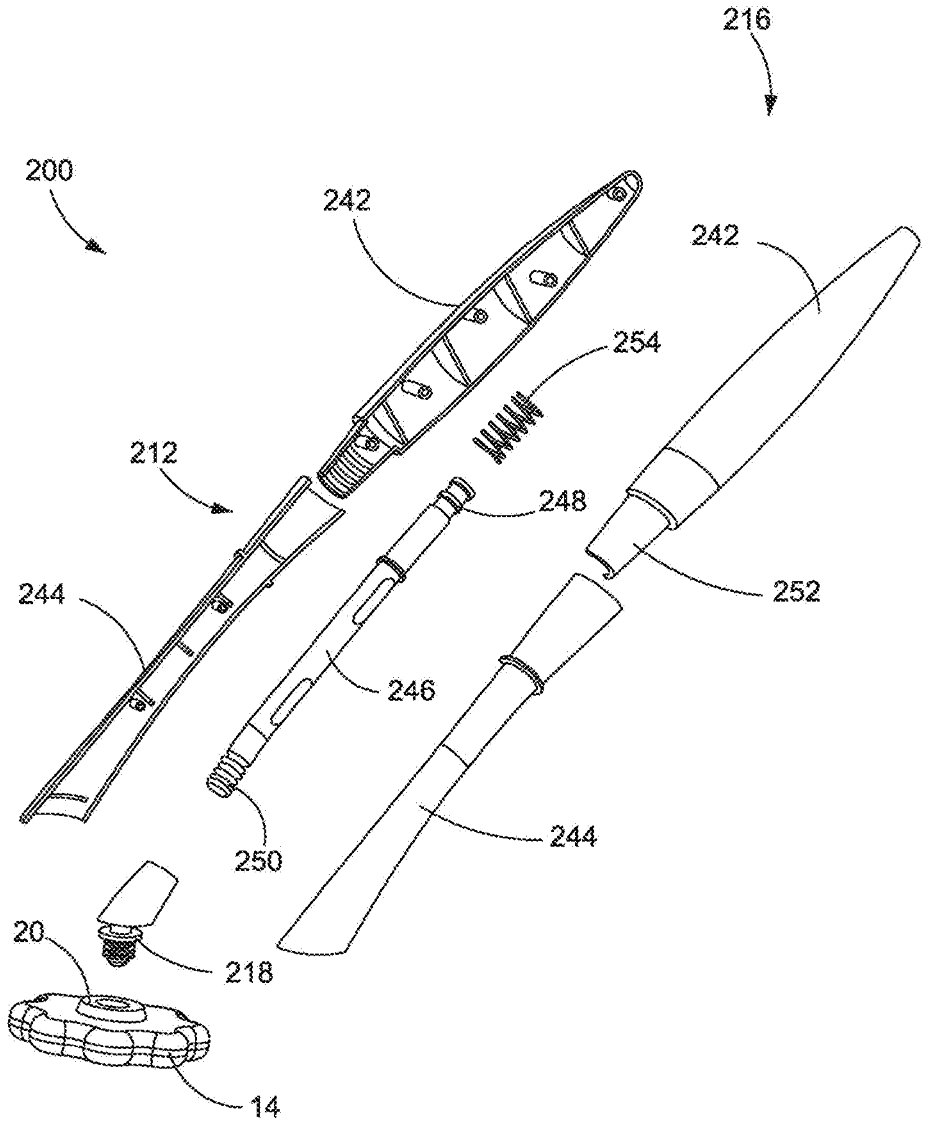
FIG. 6A is an exploded view of a scrubbing tool, according to a third embodiment.
Figure 6C:
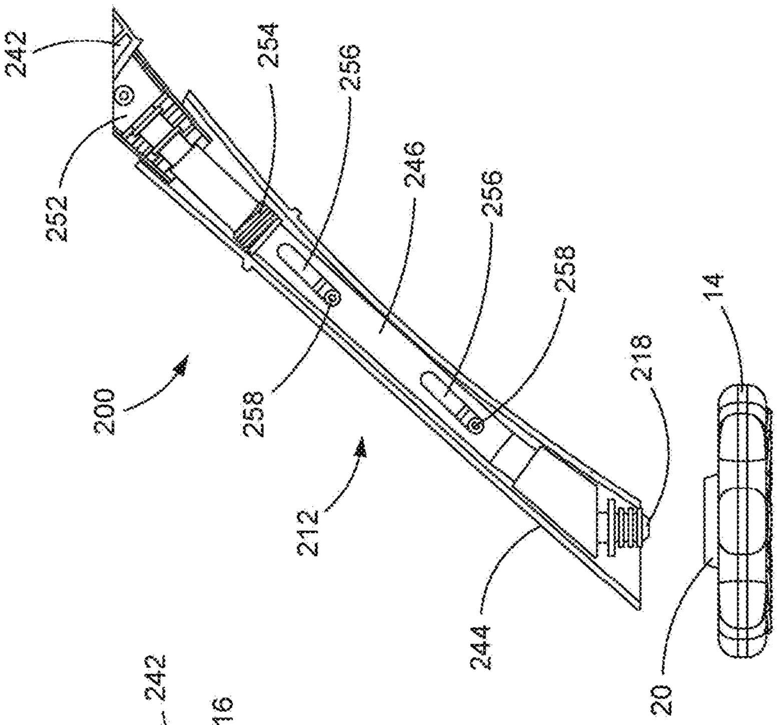
FIG. 6C is a side view of a lower portion of the scrubbing tool of FIG. 6A, in a disengaged position.
Figure 6B:
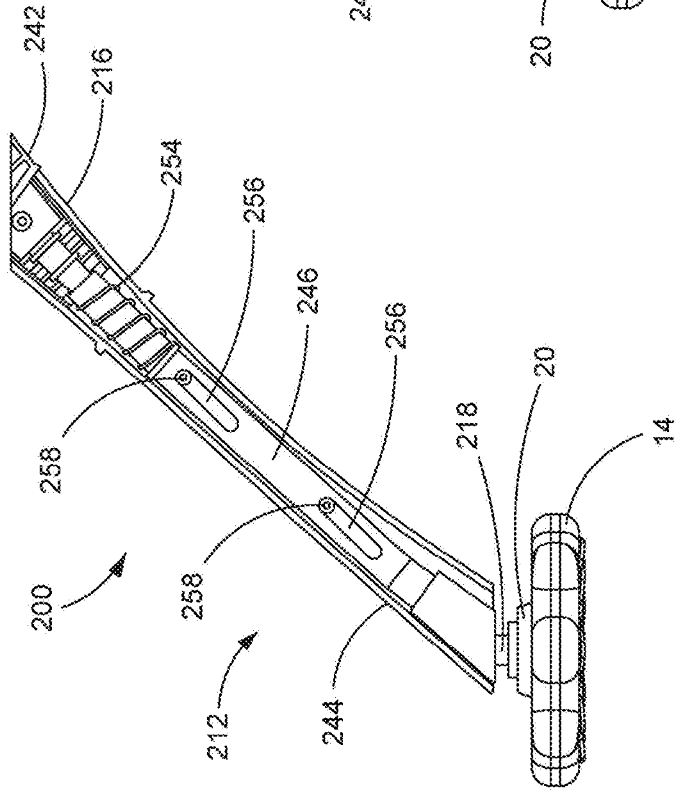
FIG. 6B is a side view of a lower portion of the scrubbing tool of FIG. 6A, in an engaged position.

FIGS. 6A-6C depict another embodiment of a scrubbing tool 200 having a handle 212 configured to operate in conjunction with the cleaning head 14. The handle 212 includes various components that enable a secure connection to the cleaning head 14 and a simple and effective release of the cleaning head 14 when cleaning is complete. For example, the scrubbing tool 200 includes a connection mechanism 216 that includes a first connector 218 configured to mate with the second connector 20 of the cleaning head 14. The handle 212 may include a first (e.g., upper) section 242 and a second (e.g., lower) section 244 that connect to each other and form an outer shell of the handle 212. For example, the first section 242 and the second section 244 may be formed as separate hollow components that, in some embodiments, each include two or more component parts that fit together to form an exterior and interior of the handle 212.

In an example embodiment, the connection mechanism 216 (see FIG. 6B) further comprises a rod 246 configured to fit within an internal cavity of the handle 212. The rod 246 includes a first (e.g., upper) end 248 and a second (e.g., lower) end 250 (as shown in FIG. 6A). The first end 248 may be fixed to the first section 242 of the handle 212.

The second section 244 of the handle 212 may be relatively movable with respect to the first section 242 of the handle 212 and the rod 246. For example, as shown in FIG. 6A the first section 242 of the handle 212 may include a sliding surface 252 that fits within a top portion of the second section 244 of the handle 212 and allows the first section 242 to slide relative to the second section 244. When assembled, the rod 246 is fixed to a bottom portion of the first section 242 such that sliding movement of the first section 242 also causes movement of the rod 246 within the second section 244 (e.g., linear translation). The first connector 218 is fixed to a bottom of the rod 246. The connection mechanism 216 is thus configured such that movement of the first section 242 causes linear movement of the first connector 218 with respect to the second section 244 via the rod 246 between a use position and a release position.

FIG. 6B depicts a lower portion of the scrubbing tool 200 with the connection mechanism 216 (see FIG. 6A) in the use position and FIG. 6C depicts a lower portion of the scrubbing tool 200 with the connection mechanism 216 in the release position. As shown, the connection mechanism 216 may further include a biasing element 254 configured to bias the first section 242 into the use position. The biasing element 254 (see FIG. 6A) may be, for example, a coil spring having a first (e.g., upper) end in a fixed position with respect to the second section 244 of the handle 212 and a second (e.g., lower) end configured to move with the first section 242 of the handle 212.

In the use position, the biasing element 254 urges the first section 242 further into the second section 244 such that the rod 246 and the first connector 218 are exposed out of a bottom end of the second section 244 and the first connector 218 can be press fit into the second connector 20. In order to remove the cleaning head 14, a user may pull the first section 242 of the handle 212 away from the second section 244 of the handle 212, causing the biasing element 254 (see FIG. 6A) to compress and pulling the rod 246 and first connector 218 up into the second section 244 of the handle 212. As a result of this motion, the attached cleaning head 14 is also pulled upward, but contacts the lower portion of the second section 244 and is thereby forced off of the first connector 218 and released from the handle 212. In some embodiments, the rod 246 may include one or more slots 256 that receive a projection 258 on an interior of the second section 244 to guide movement of the rod 246 within the second section 244.

Figure 7:
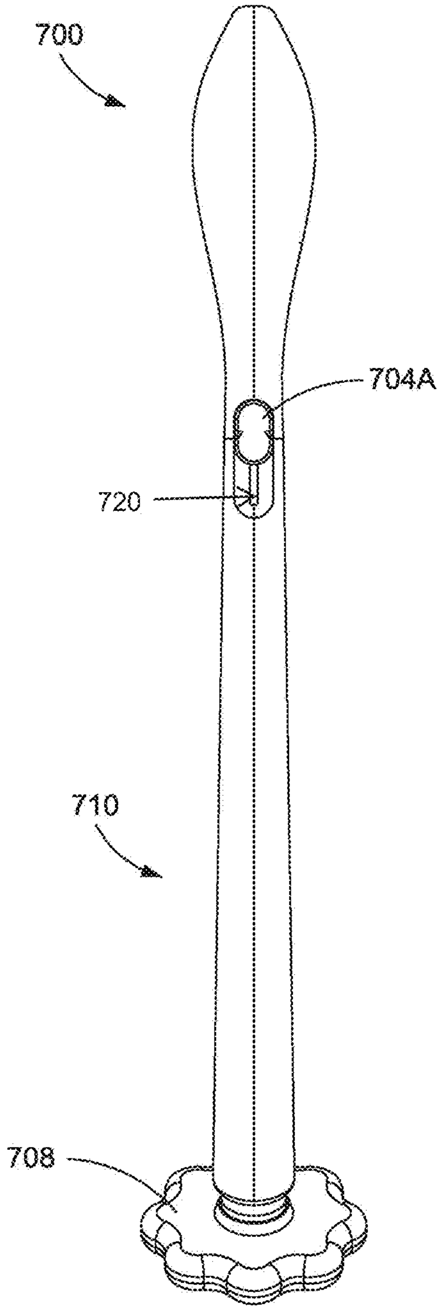
FIG. 7 is a front view of a scrubbing tool, according to other embodiments of the present invention.

FIG. 7 illustrates an alternative design of the scrubbing tool 700, according to some embodiments of the present invention. As with the design illustrated in FIGS. 1-6B, scrubbing tool 700 comprises a handle 710 and a cleaning head 708. However, a button 704A is positioned in a cutout, or aperture 720, of the handle 710. When a user provides downward force on the button 704A, a release mechanism internal to the handle 710 is activated to remove the cleaning head 708 from the handle 710.

Figure 8:
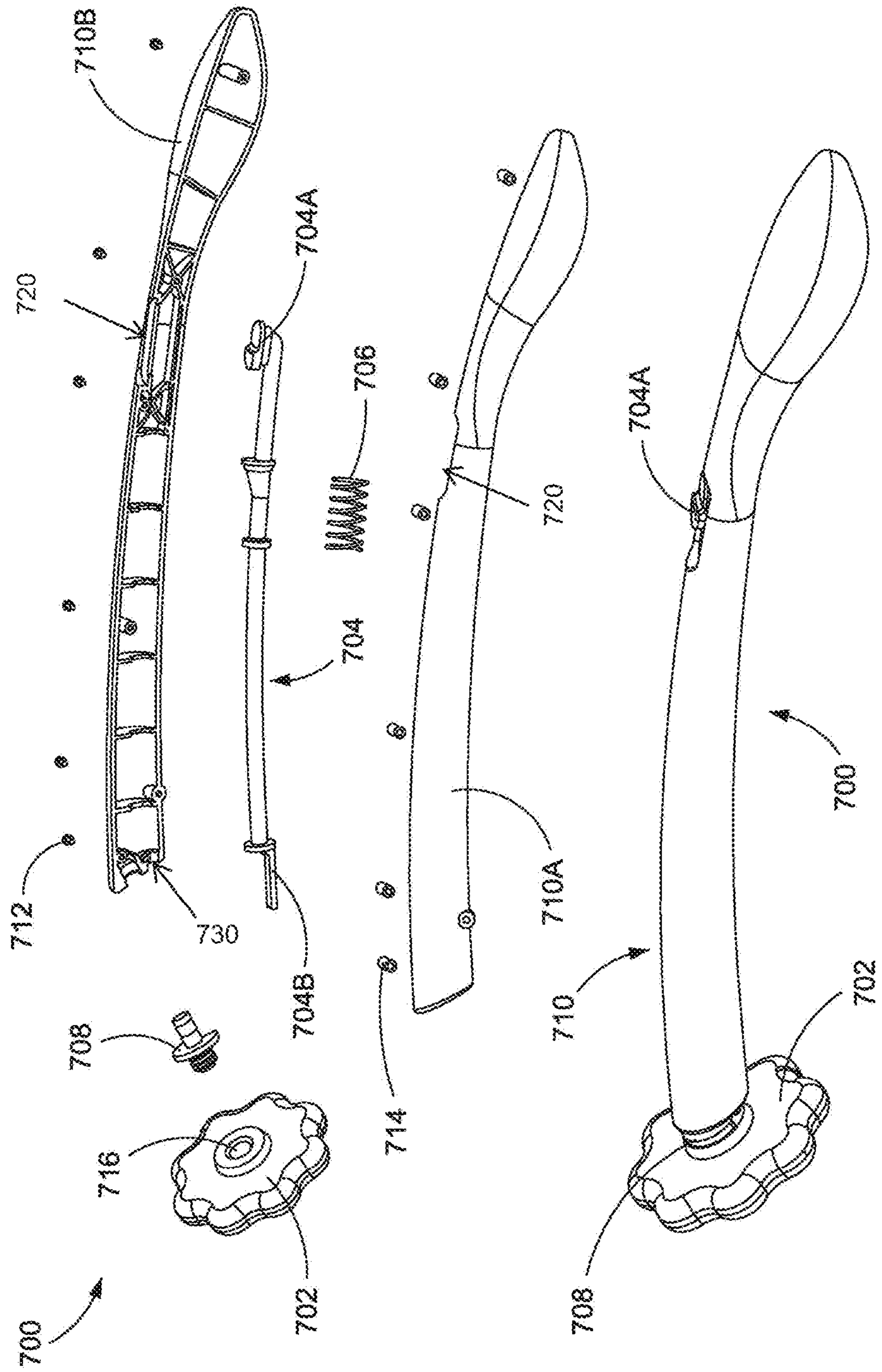
FIG. 8 provides an exploded view of the scrubbing tool shown in FIG. 7.

FIG. 8 provides an exploded view of the scrubbing tool 700, according to some embodiments. The handle 710 in this example comprises two portions 710A, 710B joined by a fastening mechanism. In FIG. 8 this fastening mechanism is a plurality of screws (e.g., screw 712) inserted into the right portion 710B of the handle 710 and designed to be engaged by nuts (e.g., nut 714) positioned in the left portion 710A of the handle 710. It should be understood that the use of screws and nuts as fastening mechanism is merely exemplary and other fastening mechanisms may be used in other embodiments.

Figure 9B:
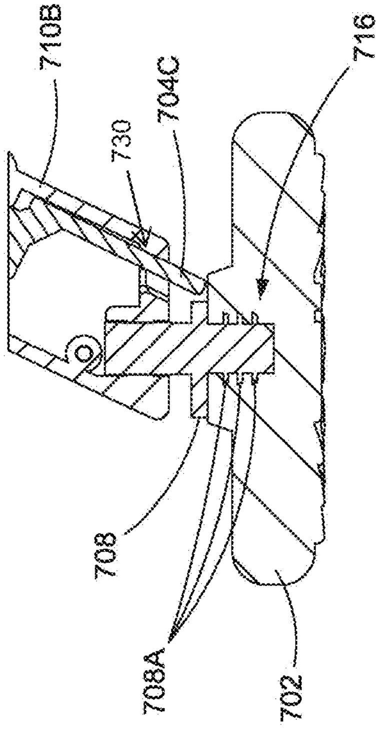
FIG. 9B provides a cutaway view of the scrubbing tool shown in FIG. 7.
Figure 9A:
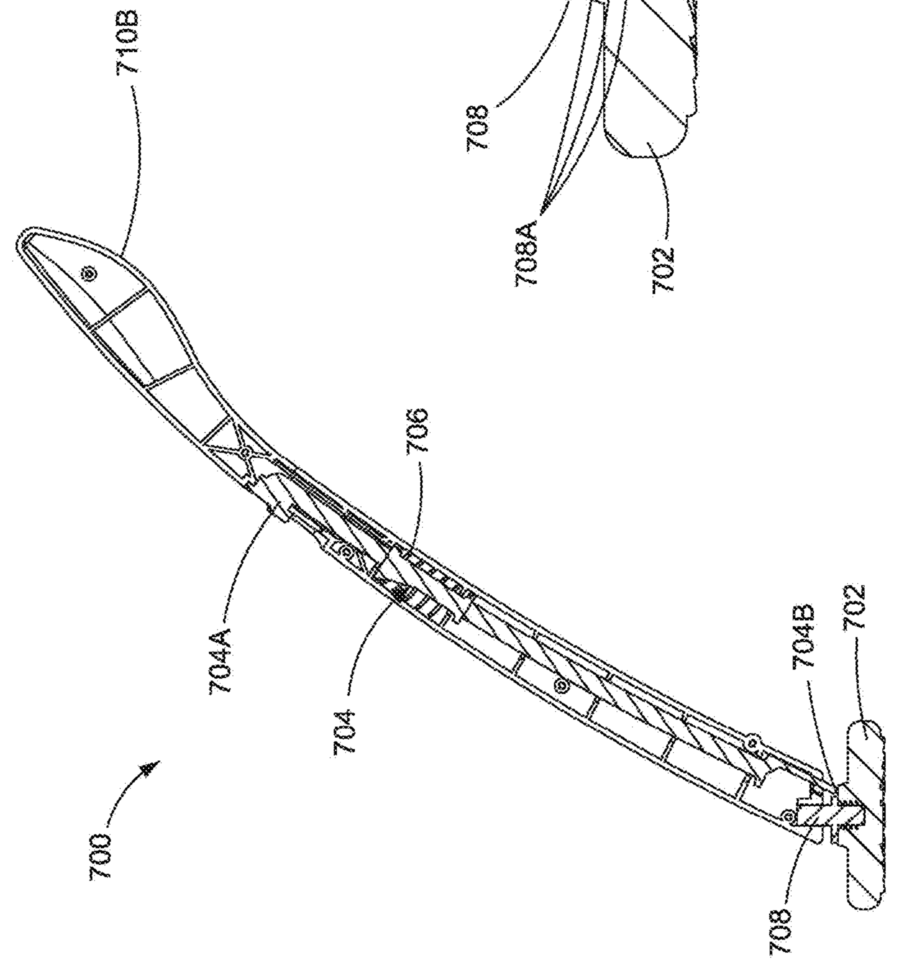
FIG. 9A provides a cutaway view of the scrubbing tool shown in FIG. 7.

A rod is positioned by the two portions 710A, 710B of the handle 710. A biasing element 706 (a coil spring in this example), holds the rod 704 in place within the handle 710. As a user applies downward force on the button 704A, the biasing element 706 compresses and a release element 704B on the rod 704 which applies the force to the cleaning head 702 to separate it from the handle. After release of the button 704A, the spring returns to its uncompressed state, thereby causing the button 704A to return to its original position. As depicted in FIG. 8, the handle 710 includes a gap 730 positioned between the connection mechanism and the second portion of the inner side wall of the shell. The gap 730 is an area free of obstructing structure, allowing the rod 704 and the release element to move unobstructed during operation. FIG. 9A provides a cutaway view of the scrubbing tool that shows how the rod 704 is situated in the handle 710.

The scrubbing tool 700 includes a connection mechanism that includes a first connector 708 configured to mate with the second connector 716 of the cleaning head 702. This connector is illustrated in detail in a cutaway view shown in FIG. 9B. As depicted in FIG. 9B, the gap 730 provides the necessary clearance for the release element 704C to engage and apply force to the dissolvable cleaning tablet 716. As with the other examples, described above, the second connector 716 comprises a cavity in the cleaning head 702. The first connector 708 comprises one or more flexible rings 708A configured to fit within the second connector 716 and provide a water-tight seal between the first connector 708 and the second connector 716. Thus, when the scrubbing tool 700 is in use, water does not flow into the internal cavity of the cleaning head and cause it to prematurely dissolve. The flexible rings each comprise a diameter that is equal to or greater than the diameter of an opening into the cavity of the cleaning head 702 such that the flexible rings provide a friction engagement with an interior of the cavity. Additionally, the first connector 708 is constructed of a flexible material (e.g., rubber) that allows it to pivot or flex with respect to the handle 710 (see, e.g., FIG. 8) such that the cleaning head 702 is able to move with respect to the handle in the engaged position while the cavity of the cleaning head 702 remains sealed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The system, components, and processes of the figures are not exclusive. Other systems, components, and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

What is claimed is:

1. A scrubbing kit, comprising:

a dissolvable cleaning tablet; and a scrubbing tool for cleaning a surface, comprising:

a shell extending between a first section and a second section, a rod positioned at least partially in the shell, the rod having a button end comprising a button accessible at the first section of the shell and a release end comprising a release element, wherein the rod can be selectively moved from a retracted position in which the release element is positioned within the shell and an extended position in which at least a portion of the release element is positioned outside of the shell by moving the button end of the rod, and a connection mechanism attached to the second section of the shell, the connection mechanism comprising a first connector including one or more flexible rings and configured to mate with a second connector of the dissolvable cleaning tablet, wherein moving the rod to the extended position causes the release element to contact and apply force to the dissolvable cleaning tablet to separate the dissolvable cleaning tablet from the connection mechanism.

2. The scrubbing kit of claim 1, wherein the scrubbing tool further comprises:

a spring disposed around the rod to bias the rod to the retracted position.

3. The scrubbing kit of claim 1, wherein the connection mechanism is attached to a first portion of an inner side wall of the shell such that a gap through which the release element can pass to contact the dissolvable cleaning tablet exists between the connection mechanism and a second portion of the inner side wall.

4. The scrubbing kit of claim 1, wherein the shell forms therethrough an aperture, wherein the button end of the rod extends through the aperture and the button is accessible outside the shell.

5. The scrubbing kit of claim 4, wherein the aperture comprises a slit such that movement of the rod is limited to linear translation.

6. The scrubbing kit of claim 1, wherein the dissolvable cleaning tablet comprises a cleaning agent.

7. The scrubbing kit of claim 1, wherein a back surface of the dissolvable cleaning tablet forms therein an opening to a cavity to mate with the connection mechanism.

8. A scrubbing tool for cleaning a surface, comprising:

a shell extending between a first section and a second section;

a rod positioned at least partially in the shell, the rod having a button end comprising a button accessible at the first section of the shell and a release end comprising a release element, wherein the rod can be selectively moved from a retracted position in which the release element is positioned within the shell and an extended position in which at least a portion of the release element is positioned outside of the shell by moving the button end of the rod; and a connection mechanism attached to the second section of the shell, the connection mechanism comprising a first connector including one or more flexible rings and configured to mate with a second connector of a dissolvable cleaning tablet, wherein moving the rod to the extended position causes the release element to contact and apply force to the dissolvable cleaning tablet to separate the dissolvable cleaning tablet from the connection mechanism.

9. The scrubbing tool of claim 8, wherein the scrubbing tool further comprises:

a spring disposed around the rod to bias the rod to the retracted position.

10. The scrubbing tool of claim 8, wherein the connection mechanism is attached to a first portion of an inner side wall of the shell such that a gap through which the release element can pass to contact the dissolvable cleaning tablet exists between the connection mechanism and a second portion of the inner side wall.

11. A scrubbing kit, comprising:

a dissolvable cleaning tablet; and a scrubbing tool for cleaning a surface, comprising:

a telescoping shell having a first section configured to be gripped by a user during a cleaning operation and a second section, a rod at least partially within the telescoping shell, the rod having a first end fixedly attached to the first section of the telescoping shell and a second free end; and a connection mechanism configured to mate with a dissolvable cleaning tablet, the connection mechanism attached to the second free end of the rod, wherein the telescoping shell can be selectively moved, by pulling the first section and the second section away from each other, from a collapsed cleaning position in which the connection mechanism is outside of the telescoping shell and an extended releasing position in which the connection mechanism is withdrawn into the second section until the dissolvable cleaning tablet contacts the second section and is forced off the connection mechanism.

12. The scrubbing kit of claim 11, wherein the scrubbing tool further comprises:

a spring disposed around the rod to bias the telescoping shell in the collapsed cleaning position.

13. The scrubbing kit of claim 11, wherein the first section comprises a sliding surface that fits within a top portion of the second section and allows the first section to slide relative to the second section.

14. The scrubbing kit of claim 11, wherein the rod is fixedly attached to the first section at a bottom portion thereof.

15. The scrubbing kit of claim 11, wherein the dissolvable cleaning tablet comprises a cleaning agent.

16. The scrubbing kit of claim 11, wherein a back surface of the dissolvable cleaning tablet forms therein an opening to a cavity to mate with the connection mechanism.

17. A scrubbing tool for cleaning a surface, comprising:

a telescoping shell having a first section configured to be gripped by a user during a cleaning operation and a second section;

a rod at least partially within the telescoping shell, the rod having a first end fixedly attached to the first section of the telescoping shell and a second free end; and a connection mechanism configured to mate with a dissolvable cleaning tablet, the connection mechanism attached to the second free end of the rod;

wherein the telescoping shell can be selectively moved, by pulling the first section and the second section away from each other, from a collapsed cleaning position in which the connection mechanism is outside of the telescoping shell and an extended releasing position in which the connection mechanism is withdrawn into the second section until the dissolvable cleaning tablet contacts the second section and is forced off the connection mechanism.

18. The scrubbing tool of claim 17, further comprising:

a spring disposed around the rod to bias the telescoping shell in the collapsed cleaning position.

19. The scrubbing tool of claim 17, wherein the first section comprises a sliding surface that fits within a top portion of the second section and allows the first section to slide relative to the second section.

20. The scrubbing tool of claim 17, wherein the rod is fixedly attached to the first section at a bottom portion thereof.

* * * * *